Patented July 10, 1945

2,380,158

UNITED STATES PATENT OFFICE 2,380,158

METHOD OF PREPARING A COCOA EXTRACT

Hans Konrad Durrenmatt, Marysville, Ohio, and Jean de Schoulepnikow, Glenbrook, Conn., assignors to Inredeco, Inc., Panama City, Panama, a corporation of Panama No Drawing. Application October 21, 1942.
Serial No. 462,816

4 Claims. (Cl. 99—23)

Our invention relates to a new and improved method of treating roasted and shelled cocoa beans, and to a new and improved water-soluble cocoa extract. Said roasted and shelled cocoa beans are commonly designated as cocoa nibs or cacao nibs.

According to our method, we secure an increased yield of cocoa butter from said nibs by processing said nibs so as to make a substantially fat-free aqueous cocoa extract, prior to defatting said nibs. The improved cocoa extract is substantially fat-free and it is easily and wholly soluble in milk and in water at 20° C. and at lower temperatures, so that said solution remains free from sediment, even when it is allowed to stand for twelve hours. Said extract may be used in the aqueous condition in which it is originally finished, or said finished aqueous extract may be bottled, canned, sterilized, concentrated or dried. The aqueous or dry extract may be used in various combinations, as in ice-cream mixes, and as an addition to drugs, foods, etc.

After the cocoa nibs have been processed so as to make said aqueous cocoa extract, said nibs can be ground to a paste and subjected to heat and pressure, in order to extract the fat from the paste. The residual cocoa cakes can then be treated with fat solvents, in order to remove any remaining fat.

Numerous additional objects of our invention will be stated in the annexed description, which states a preferred embodiment thereof, it being understood that the invention is not limited to the details stated herein.

According to known methods of making so-called cocoa essence or extract, the coarsely broken nibs are usually made into a cocoa paste by grinding with heated stones or heated rolls.

According to known methods, in order to extract some of the cocoa butter, the pure cocoa paste is subjected to pressure at about 70° C. to 80° C., so that the residual cakes contain from 10% to 25% of fat. Such cakes are then ground and bolted into a fine powder, thus producing such essence or extract. In order to prepare the so-called Dutch-processed or "solubilized" cocoa, according to known methods, the cocoa beans are treated with alkali during the roasting operation, or the ground cocoa nibs are treated with alkali before extracting the fat. It is also known to heat the fine powder, with or without water, in closed vessels to 150° C.

According to our method, a sufficient quantity of water is forced through coarsely broken nibs, as distinguished from a paste, at a temperature of about 100°–180° C. The size of said nibs may be between about 0.5 inch to 0.12 inch, or between 0.18 inch to 0.12 inch, when treated according to our method. The size of said nibs should be at least about 0.12 inch. Said nibs contain certain organic acids, such as oxalic acid and phosphoric acid. We have discovered that by forcing a sufficient volume of water under pressure through said nibs, at a suitable high temperature, the starch of the nibs is made water-soluble, and said starch is at least partially hydrolyzed to dextrins, dextrose, and other degradation products. In addition, the hemicelluloses of said coarse nibs are at least partially hydrolyzed to water-soluble carbohydrates, which are probably the lower sugars. The organic acids which are natural ingredients of the nibs, exert the necessary hydrolyzing action, under the conditions stated herein. It is important to process coarse nibs, as distinguished from a paste, in order to get the improved results. In the cocoa paste, the fat causes the finely divided nibs to adhere to each other. We use coarsely broken nibs, which contain all the original fat as well as the flavoring ingredients. Said coarse broken nibs do not adhere to each other.

The aqueous extract which is thus secured has an acid reaction. It is substantially free from fat, because the cocoa nibs retain substantially all the original fat of said nibs. This aqueous extract is then freed from non-fatty water-insoluble material by filtering, centrifuging, or in any other suitable manner. Said aqueous extract contains substantially all the flavoring ingredients of the cocoa, including the aromatic ingredients thereof, the alkaloids, tannins, etc.

The exhausted cocoa nibs which remain after this aqueous extraction can then be dried and ground to make a paste which is subjected to heat and pressure in the known manner, in order to extract the cocoa fat therefrom. Under the same conditions of heat and pressure, we secure a higher yield of cocoa butter from the paste which is made from the exhausted nibs, because said nibs have been freed from starch and hemi-celluloses, prior to such extraction of fat. Under the same conditions of heat and pressure, 100 kilograms of finely ground nibs yield 47 kilograms of cocoa butter, when the nibs are merely finely ground, prior to such extraction of fat, according to the known method, whereas 100 kilograms of nibs which have first been treated according to our process, yield 49.25 kilograms of cocoa butter. Under the same conditions of heat and pressure, we therefore increase the yield of cocoa butter by about 5%. According to our method, the weight of the solute in said aqueous extract is about 15% of the original weight of the nibs. The residual cocoa cake which remains after said extraction of fat under heat and pressure, contains about 10% of cocoa butter, which can be extracted with the use of fat solvents in the known manner.

The details of the method will vary with the type of cocoa nib. The following example applies to the treatment of a mixture of equal parts by weight of arriba and accra cacao nibs, from which the germs or radicals of the cacao beans have been preferably removed. Our invention applies to all types of cacao nibs. The invention is not limited to the removal of the said germs.

Said nibs, which have the range of sizes above mentioned, are closely packed, without pressure, in extraction cells or columns of the known type. Due to the coarseness of said nibs, they remain non-adherent during the treatment later specified, as distinguished from the formation of a paste. We prefer to use cells or columns whose combined or total height is at least ten meters, in order to produce an aqueous cocoa extract which is substantially free from fat and which has a small proportion of water-insoluble substances. Each cell is held vertical and the water is forced upwardly through each cell.

We prefer to use the familiar countercurrent principle, whereby two vertical cells are connected in series, so that the top of the first cell is connected to the bottom of the second cell. The first cell contains a mass of exhausted coarse nibs which have been previously extracted with water, according to our method. Said coarse exhausted nibs contain their original fat. Said coarse exhausted nibs are left in said first cell, after said previous extraction with water, without handling or processing said coarse exhausted nibs. The second cell contains a mass of fresh nibs of the range of sizes above mentioned, which have not been extracted. The water passes upwardly first through said first cell, and then upwardly through said second cell. Other details of the arrangement of two or more cells, in order to use the familiar countercurrent principle, are not stated, as they are well-known.

The water can enter said first cell, to contact with the exhausted nibs, at a temperature as high as 180° C., and it can leave said first cell at a temperature as high as 150° C. The hemi-cellulose of the exhausted nibs is thus hydrolyzed and dissolved in the water, in said first cell. The water which contains such hydrolyzed and dissolved hemi-cellulose, preferably enters the second cell at a temperature of substantially 100° C., and it preferably leaves said second cell at a temperature of substantially 80° C. Tests have shown that said hemi-cellulose is not noticeably hydrolyzed, unless the temperature of the water is at least substantially 130° C.

We prefer to use enough water in said percolation, so that we secure a kilogram of aqueous extract per kilogram of cocoa nibs. When said aqueous extract is freed from water-insoluble ingredients, said aqueous extract contains about 15% of dissolved solids. Hence, we remove about 15% of the weight of the cocoa nibs, either in the form of substances which are originally water-soluble, or which are rendered water-soluble by our method. Hence we remove at least a major proportion of the starch and hemi-cellulose from the nibs, while retaining substantially all the fat in said nibs.

The aqueous extract is freed from the water-insoluble solids therein, preferably by centrifuging said aqueous extract through a clarifying filter of known type. The weight of the water-insoluble material which is thus separated is about 0.4% of the original weight of the cacao nibs. Said separated water-insoluble materials are added to the cocoa nibs which have been extracted with water according to our method, before extracting the cocoa butter from said nibs.

The clarified aqueous extract is slightly acid. Its pH number is about 5.3. Potassium carbonate or other suitable alkali material is dissolved in said acid extract, until it is slightly alkaline, with a preferred pH number of about 8.2. Said pH number may be 8.0 to 8.8. The weight of said potassium carbonate is generally about 8% to 10% of the weight of the solute of said clear aqueous extract. The amount of said potassium carbonate or equivalent material which is used, depends upon the type of cocoa nib which is processed.

The clear and alkaline aqueous extract is now boiled in an open vessel at standard atmospheric pressure, for a period of two hours. This develops the cocoa-red color, by oxidizing the tannins, and converts the original harsh and astringent taste to the true cocoa flavor. Under the percolation conditions stated herein, there is insufficient oxygen to oxidize the tannin which is extracted from the nibs. By thus boiling in an open vessel, the unoxidized tannin takes up the oxygen which is required to oxidize the tannin.

The extract is now made either neutral or slightly acid. A slight acidity is preferred, for best flavor. The pH number of the extract is thus changed to about 6.8 to 7.0. We prefer to use a weak organic acid in order to render the extract neutral or slightly acid. For example, we can use tartaric acid. We can use an acid which is present in the original nibs. The acid is added to the aqueous extract, preferably at a temperature of 90° C.

The finished aqueous extract which is thus secured can be used in its original aqueous form, or it can be concentrated by evaporating some of the water thereof. It can be enriched by mixing with milk and/or by dissolving sucrose therein.

The enriched or unenriched aqueous extract can be sterilized, bottled, canned, etc. It can also be dried, in order to produce a powder, which is wholly and easily soluble in milk or water at 20° C. and below. Such a solution develops no sediment, even upon standing for twelve hours. This freedom from sediment results from the substantial absence of cellulose.

A typical dried powder which is made from a sweetened aqueous extract consists of 46.5% of non-fatty and water-soluble solids, 46.6% of sucrose, 0.1% of cocoa butter, 1.7% of moisture, and 5.1% of potassium tartrate and tartaric acid.

Five grams of said dried extract, when dissolved in 200 cc. of cold or hot milk, produce the same color and flavor, including aroma, as if 5 grams of ordinary cocoa powder and 2.5 grams of sucrose were dissolved in the same quantity of milk.

The above method can be used for processing cacao nibs which have their germs or radicals, although we prefer to process nibs from which said germs or radicals have been removed.

We have disclosed a complete and preferred embodiment of our invention, but numerous changes and omissions can be made without departing from its scope.

For example, the nibs we have processed according to our method can be of any size, as long as water can be percolated through said nibs at the temperatures above mentioned, and under the respective pressures which correspond to said temperatures. For example, if the water enters the apparatus at a temperature of 180° C., said water is admitted from a boiler which is under an absolute pressure of about 150 lbs. per square inch. The nibs must be sufficiently coarse to prevent the formation of a dense or pasty impervious mass which would prevent the percolation of the water through the nibs. When we refer to coarse nibs, we include nibs of any size which will not form such an impervious mass. It is preferable to break up the original nibs, in order to produce a closer packing thereof in the extraction cell, but the nibs can be used in their original size. In actual practice, we use cylindrical extraction cells. The height of each cell is five meters, and its internal diameter is 0.380 meter. Such a cell is packed with about 288 kilograms of coarse cacao nibs. The period of extraction of such a mass is about eighty minutes. Cacao fat or cocoa butter melts at about 30° C. If the nibs are finely ground so as to destroy their cell-walls, the fat is removed from the fine powder, when such powder is heated with water at 100° C. However, we use nibs which are sufficiently coarse so that the unruptured cell-walls of said coarse nibs retain the fat while the flavoring ingredients are leached out of said unruptured cells.

One of the features of our invention is to use sufficient water, not only to hydrolyze at least a major proportion of the starch and hemi-celluloses, but also to dissolve the hydrolyzed water-soluble products in said water, in order to remove the same from the nibs.

If the dry cocoa extract is made without the use of sugar, said extract consists of approximately 87% of non-fatty and water-soluble solids, about 0.2% of fat, about 3% of moisture, the remainder consisting of potassium tartrate and tartaric acid, which are non-injurious. Hence the percentage of fat does not exceed substantially 0.2% of the water-soluble solids, and the percentage of moisture does not exceed substantially 3% of said water-soluble solids. The hydrolyzed starch and the hydrolyzed hemi-celluloses absorb or otherwise retain the flavoring ingredients of the cocoa, prior to and during spray-drying, if the extract is dried by the spray-drying method, so that the spray-dried extract is stable. Said spray-dried extract or an extract, which may be dried in any manner, should be packed in airtight and moisture-tight cans or other containers. We have described a preferred embodiment of our invention, but it is clear that numerous changes and omissions and additions can be made without departing from its spirit.

We claim:

1. A method of making a water-soluble cacao extract, which consists in treating broken and non-adherent cacao nibs which contain substantially all their original fat, with sufficient water and at a sufficiently high temperature to hydrolyze the starch and at least a major proportion of the hemi-celluloses of said nibs and to dissolve said hydrolyzed products out of said nibs, while leaving substantially all the fat in said broken nibs, clarifying and alkalizing said aqueous extract, and heating said clarified and aqueous extract in the presence of oxygen, until the cocoa-red color is developed.

2. A method of making a water-soluble cacao extract, which consists in treating non-adherent and broken cacao nibs which contain substantially all their original fat, with sufficient water and at a sufficiently high temperature to hydrolyze the starch and at least a major proportion of the hemi-cellulose of said nibs and to dissolve said hydrolyzed products out of said nibs, while leaving substantially all the fat in said broken nibs, clarifying and alkalizing said aqueous extract, and heating said clarified and aqueous extract in the presence of oxygen, until the cocoa-red color is developed, and then at least neutralizing said extract after said cocoa-red color has been developed.

3. In the art of treating an aqueous and substantially fat-free aqueous extract of the flavoring ingredients of cocoa, the pH number of said extract being less than seven, said extract containing a tannin, which has been extracted from the cocoa, those steps which consist in alkalizing said extract so that its pH exceeds seven, heating said alkalized aqueous extract in contact with oxygen to oxidize said tannin and to develop the cocoa-red color, and then at least neutralizing said alkalized aqueous extract.

4. In the art of treating an aqueous and substantially fat-free aqueous extract of the flavoring ingredients of cocoa, the pH of said extract being less than seven, said extract containing a tannin which has been extracted from the cocoa, those steps which consist in alkalizing said extract until its pH number is substantially 8.0 to 8.8, then heating said extract in the presence of oxygen to oxidize said tannin and to develop the cocoa-red color, then acidifying said extract until its pH number is substantially 6.8 to seven.

HANS KONRAD DURRENMATT.
JEAN DE SCHOULEPNIKOW.